United States Patent [19]

Furukawa et al.

[11] Patent Number: 4,756,925

[45] Date of Patent: Jul. 12, 1988

[54] PLASMA AND ION PLATING TREATMENT OF POLYMER FIBERS TO IMPROVE ADHESION TO RFL RUBBER

[75] Inventors: Masashi Furukawa, Blacksburg, Va.; Tadahiko Takata, Osaka, Japan

[73] Assignee: Teijin Limited, Osaka, Japan

[21] Appl. No.: 28,253

[22] Filed: Mar. 20, 1987

[30] Foreign Application Priority Data

Mar. 31, 1986 [JP] Japan ............................. 61-71333
Apr. 4, 1986 [JP] Japan ............................. 61-76697

[51] Int. Cl.$^4$ .................. B05D 3/06; C23C 14/00; B29D 30/00
[52] U.S. Cl. .......................... 427/39; 427/40; 428/395; 204/192.31; 156/117
[58] Field of Search ............... 427/38, 39, 40, 41; 428/395; 204/192.31; 156/117

[56] References Cited

U.S. PATENT DOCUMENTS

| | | | |
|---|---|---|---|
| 3,642,565 | 2/1972 | Ogata et al. | 428/395 |
| 3,642,568 | 2/1972 | Ando et al. | 428/395 |
| 3,663,265 | 5/1972 | Lee et al. | 427/41 |
| 4,401,713 | 8/1983 | Takata et al. | 428/395 |
| 4,557,967 | 12/1985 | Willemson et al. | 428/395 |

OTHER PUBLICATIONS

E. Lawton, "Adhesion Improvement of Tire Cord Induced by Gas Plasma", *Journal of Applied Polymer Science*, 18, 1974, pp. 1557-1574.

*Primary Examiner*—Norman Morgenstern
*Assistant Examiner*—Margaret Burke
*Attorney, Agent, or Firm*—Burgess, Ryan & Wayne

[57] ABSTRACT

A modified fibrous material useful as a reinforcing material for rubber articles is produced by applying a cold plasma treatment to a fibrous material comprising at least one type of synthetic fibers selected from aromatic polyamide fibers and polyester fibers under a reduced pressure; by applying an ion-plating treatment with a polyamide vapor to the resultant cold plasma-treated fibrous material under a reduced pressure; by impregnating the resultant ion-plated fibrous material with an RFL adhesive composition comprising a resorcinol-formaldehye precondensation product and a rubber latex; and by curing the adhesive composition in the fibrous material.

15 Claims, No Drawings

PLASMA AND ION PLATING TREATMENT OF POLYMER FIBERS TO IMPROVE ADHESION TO RFL RUBBER

BACKGROUND OF THE INVENTION

1. Field of the Invention

The present invention relates to a process for producing a modified fibrous material useful for reinforcing rubber articles. More particularly, the present invention relates to a process for producing a modified fibrous material comprising aromatic polyamide fibers and/or polyester fibers having an enhanced bonding property to rubber and an excellent heat resistance, and thus useful as a reinforcing material for rubber articles. Still more particularly, the present invention relates to a process for producing a modified fibrous material comprising aromatic polyamide fibers and/or polyester fibers, and useful for producing a fibrous material-reinforced rubber composite article having an enhanced rubber coverage on the fibrous material when the fibrous material is peeled from the composite article, a satisfactory softness, and an excellent resistance to fatigue.

2. Description of the Related Art

It is known that aromatic polyamide fibers exhibit a higher tensile strength, modulus, heat resistance, water resistance, and dimensional stability at an elevated temperature or in water than other ordinary synthetic polymeric fibers and, therefore, are useful as reinforcing materials for rubber articles, for example, tires, belts, and hoses.

Also, it is known that polyester fibers, for example, polyethylene terephthalate fibers, exhibit a high tensile strength, Young's modulus, low elongation and creep, and an excellent resistance to fatigue and, therefore, are useful as reinforcing materials for rubber articles. Further, it is known that the naked surfaces of the aromatic polyamide fibers and the polyester fibers exhibit a poorer bonding property to rubber than other ordinary synthetic fibers, for example, nylon 6 fibers and nylon 66 fibers, which are usually utilized as reinforcing fibers for rubber articles. This is because the affinity of hydrogen bonds in the ester structure in the polyester molecules and in aromatic amide structures in the aromatic polyamide molecules to the rubber, is poorer than that of other ordinary polymer molecules. Accordingly, it is necessary to enhance the bonding property of the aromatic polyamide and polyester fibers to rubber by a specific surface treatment.

In a conventional surface treatment, the surfaces of the aromatic polyamide and polyester fibers are coated with an adhesive material, for example, an epoxy compound, isocyanate compound or a mixture (RFL) of a resorcinol-formaldehyde resin and a rubber latex. However, the conventional adhesive materials are not satisfactory for use with the aromatic polyamide and polyester fiber materials.

There have been various attempts to enhance the bonding property of the aromatic polyamide and polyester fiber materials to rubber. For example, before the surface treatment with the resorcinol-formaldehyde-rubber latex (RFL), the fibrous material is pretreated with an aqueous solution or dispersion of an epoxy compound, or with a polyamide or polyamide derivative. This attempt does not always satisfactorily enhance the bonding property of the fibrous material. Furthermore, it is known that the surface-treated fibrous material by the conventional treatment exhibits an undesirably increased stiffness, a degraded molding property, and a decreased resistance to fatigue.

The Journal of Applied Polymer Science, Vol. 18, pages 1557 to 1574 (1974) discloses a process for improving the bonding property of a polyester fiber material to rubber, comprising the steps of applying a low temperature plasma treatment to the polyester fiber material under a reduced pressure to activate the fiber surfaces thereof, and impregnating the plasma-treated polyester fiber material with a resorcinol-formaldehyde-rubber latex (RFL).

Japanese Unexamined Patent Publication No. 61-19881 discloses a process for enhancing the bonding property of a polyester or aromatic polyamide fiber material to rubber by a low temperature plasma treatment and a resorcinol-formaldehyde-rubber latex-treatment.

Japanese Unexamined Patent Publication No. 60-250036 discloses a process for bonding an aromatic polyamide fiber material to a rubber material by applying a low temperature plasma treatment to the fiber material and by bonding the plasma-treated fiber material to the rubber material with an adhesive composition comprising a resorcinol-formaldehyde precondensation product having a high molecular weight and a rubber latex.

The above-mentioned attempts satisfactorily enhance the initial bonding property of the fiber material to the rubber material but do not give a satisfactory heat resistance of the resultant reinforced rubber article in practical use.

SUMMARY OF THE INVENTION

An object of the present invention is to provide a process for producing a modified fibrous material containing aromatic polyamide fibers and/or polyester fibers and having an enhanced binding property to rubber, particularly, an excellent heat resistant bonding property to rubber and, therefore, usable for reinforcing rubber articles.

The above-mentioned object is attained by the process of the present invention which comprises the steps of applying a cold plasma treatment to a fibrous material comprising at least one type of synthetic fibers selected from aromatic polyamide fibers and polyester fibers under a reduced pressure; applying an ion-plating treatment with a polyamide vapor to the resultant cold plasma-treated fibrous material under a reduced pressure; and impregnating the resultant ion-plated fibrous material with an adhesive composition comprising a resorcinol-formaldehyde precondensation product and a rubber latex.

The adhesive composition in the fibrous material is dried and cured at an elevated temperature.

DESCRIPTION OF THE PREFERRED EMBODIMENTS

The fibrous material to be subjected to the process of the present invention comprises at least one type of synthetic fibers selected from aromatic polyamide fibers and polyester fibers.

The aromatic polyamide fibers include poly-p-phenylene terephthalamide fibers, poly-p-benzamide fibers, and preferably, aromatic polyetheramide fibers. The aromatic polyetheramide fibers preferably comprise an aromatic polyether amide polymer containing repeating units of the formulae (I), (II), (IV), and optionally, (III):

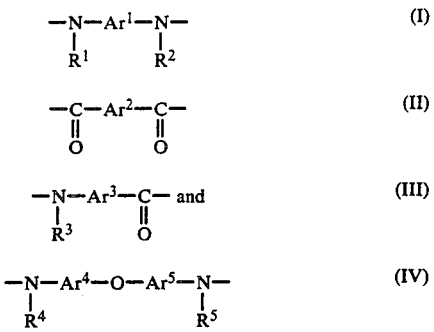

$$-\underset{R^1}{N}-Ar^1-\underset{R^2}{N}- \quad (I)$$

$$-\underset{O}{\overset{\|}{C}}-Ar^2-\underset{O}{\overset{\|}{C}}- \quad (II)$$

$$-\underset{R^3}{N}-Ar^3-\underset{O}{\overset{\|}{C}}- \text{ and} \quad (III)$$

$$-\underset{R^4}{N}-Ar^4-O-Ar^5-\underset{R^5}{N}- \quad (IV)$$

wherein $Ar^1$, $Ar^2$ and $Ar^3$, respectively, represent, independently from each other, a member selected from divalent aromatic hydrocarbon ring residues having two bonds extending in coaxial or parallel directions to each other and divalent aromatic heterocyclic ring residues having two bonds extending from two atoms spaced a largest distance from each other on the ring; $Ar^4$ and $Ar^5$, respectively, represent, independently from each other, a member selected from p-phenylene radical and m-phenylene radical; and $R^1$, $R^2$, $R^3$, $R^4$ and $R^5$, respectively, represent, independently from each other, an alkyl radical having 1 to 5 carbon atoms.

Preferably, in the aromatic polyetheramide, the sum of the molar amounts of the repeating units of the formulae (I) and (IV) is substantially equal to that of formula (II), the repeating units of formula (III) are in an amount of 0 to 90 molar %, and the repeating units of formula (IV) are in an amount of 5 to 50 molar %, more preferably 10 to 30 molar %.

The alkyl radical represented by $R^1$ to $R^5$ in the formulae (I), (III), and (IV) includes methyl, ethyl, propyl, butyl, and pentyl radical, and preferably, is a methyl radical.

The aromatic hydrocarbon ring residues and the aromatic heterocyclic ring residues may be unsubstituted or substituted by one or more substituents selected from halogen atoms, including chlorine, bromine, and fluorine atoms, lower alkyl radicals, for example, methyl, ethyl, isopropyl, and n-propyl radicals, lower alkoxyl radicals, for example, methoxy, and ethoxy radicals, cyano radicals, acetyl radicals, and nitro radicals, preferably by a chlorine atom or a methyl radical.

The polyester fibers usable for the process of the present invention are preferably selected from polyethylene terephthalate fibers, polybutylene terephthalate fibers, and polyethylene naphthalate fibers.

The fibrous material may be in any form, for example, woven fabric, knitted fabric, nonwoven fabric, yarn, threads, cord, net, and fiber mass, but preferably, is in the form of a multifilament yarn woven fabric.

In the first step in the process of the present invention, a cold plasma treatment is applied to the fibrous material under a reduced pressure, to act as reinforcement of a weak boundary layer (WBL) in the fiber surface, to cleanse the fiber surface, to produce active groups in the fiber surface, and to form a number of concavities and convexities on the fiber surface. That is, the cold plasma treatment is effective for enhancing the close bonding of the fiber surface with the ion-plated polyamide layer formed on the fiber surface in the next ion-plating step.

The cold plasma treatment is carried out by generating a cold plasma of a non-polymerizable gas under a reduced pressure and exposing the surface of the fibrous material to the cold plasma. The generation of the cold plasma can be effected by applying an electric power of, for example, 10 to 500 W, at a frequency of, for example, 1 to 5000 MHz. The electrical discharge may be a polarized or nonpolarized discharge.

The cold plasma treatment can be effected by utilizing low frequency waves, high frequency waves, microwaves, radiowaves, or direct current. Also, the cold plasma can be generated by glow discharge, corona discharge, spark discharge, or silent discharge. The electrodes for the cold plasma generation may be selected from any conventional electrodes, for example, an outer electrode, inner electrode, or when radiowaves are used, a capacitor-connection electrode or induction-connection electrode.

The cold plasma is generated in a non-polymerizable gas atmosphere containing at least one member selected from, for example, oxygen, nitrogen, carbon monoxide, carbon dioxide, nitrous oxide, nitrogen dioxide, hydrogen, helium, neon, argon, and tetrafluoromethane.

The reduced pressure for the cold plasma treatment is variable depending on the treating temperature and time. However, preferably the cold plasma treatment is applied under a reduced pressure of $10^{-5}$ to 10 Torr, for example, when a high frequency glow discharge is utilized, to prevent overheating of the fibrous material.

If the pressure is more than 10 Torr, sometimes the cold plasma treatment utilizing the high frequency glow discharge results in overheating of the fibrous material, and thus in a deterioration of the fibrous material. Alternatively, if the plasma-generating pressure is less than $10^{-5}$ Torr, sometimes the generation of the glow discharge is unstable and the cold plasma treatment is not effective.

The cold plasma treatment is preferably carried out at a temperature of 20° to 200° C.

In the second step in the process of the present invention, the cold plasma-treated fibrous material is subjected to an ion-plating treatment with a polyamide vapor under a reduced pressure.

In the ion-plating treatment step, a polyamide is melted and vaporized at an elevated temperature under a reduced pressure. The resultant polyamide vapor is introduced into a plasma generating apparatus and is made into a plasma state to activate or ionize the vapor. Alternatively, the polyamide vapor is exposed to a plasma generated by another gas to activate or ionize the polyamide vapor.

The cold plasma-treated fibrous material is exposed to the activated or ionized polyamide vapor to allow the polyamide vapor to be cooled and deposited on the surface of the fibrous material, to form an ion-plated polyamide layer firmly fixed to the cold plasma-treated fibrous material surface.

The polyamide usable for the process of the present invention includes polycondensation products of dicarboxylic acids with diamine, for example, polyhexamethyleneadipamide (nylon 66) and polyhexamethylenesebacamide (nylon 610), polycondensation products of ω-aminocarboxylic acids, and ring-opening polymerization products of lactams, for example, poly-ϵ-capramide (nylon 6). The polyamide may be an aliphatic polyamide, aromatic polyamide, or polyamide containing at least one aliphatic cyclic ring or heterocyclic ring in a backbone chain in the polymeric molecule thereof.

The polyamide usable for the present invention is not limited to a polyamide having a specific degree of polymerization or intrinsic viscosity thereof. However, for example, poly-ε-capramide preferably has an intrinsic viscosity [η] of 0.8 to 1.5 determined in a solvent consisting of m-cresol at a temperature of 35° C.

The polyamide to be subjected to the ion-plating treatment step may be in any state, for example, in the form of a bulk, film, filaments, or a powder.

The polyamide is contained in a metal port, or ceramic crucible, and is melted and vaporized under a vacuum by heating to a temperature of 200° C. to 300° C. by means of an electric resistance heating in which an electric current is applied to the polyamide, or by means of a EB heating wherein electron beams generated from an electron gun are irradiated to the polyamide.

Preferably, the ion-plating treatment is carried out under vacuum and the pressure of the polyamide vapor in the ion-plating treatment system is adjusted to a level of $10^{-5}$ to 10 Torr.

In the ion-plating treatment apparatus, the polyamide vapor may be mixed with argon, oxygen and/or ammonia gas. However, the total pressure of the mixed gas and vapor is preferably adjusted to the level of $10^{-5}$ to 10 Torr.

The polyamide vapor can be made into a plasma state by applying electric energy, for example, a high frequency wave, low frequency wave or microwave energy, to the polyamide vapor.

When the polyamide vapor is made into a plasma state or is exposed to a plasma, the activated polyamide vapor particles have an increased energy. This increased energy of the activated polyamide vapor can be controlled to a desired level by applying a bias voltage between the fibrous material and electrode for generating the plasma, for example, a high frequency wave-electrode.

The ion-plated polyamide layer preferably has a thickness of 0.05 to 1 μm.

In the third step in the process of the present invention, the polyamide-plated fibrous material is impregnated with an specific adhesive composition comprising a resorcinol-formaldehyde precondensation product and a rubber latex. This type of adhesive composition is a so-called RFL.

In the RFL adhesive composition, the resornicol and the formaldehyde are preferably in a molar ratio of from 1:0.1 to 1:8, more preferably, from 1:0.5 to 1:5, still more preferably, from 1:1 to 1:4.

The rubber latex usable for the present invention preferably comprises at least one member selected from, for example, natural rubber latex, styrene-butadiene copolymer rubber latex, vinyl pyridine-styrene-butadiene terpolymer rubber latex, nitrile rubber latex, and chloroprene rubber latex. Preferably, the rubber in the rubber latex for the present invention contains 50% to 100% by weight of a vinyl pyridine-styrene-butadiene terpolymer rubber.

In the adhesive composition RFL, the resorcinol-formaldehyde precondensation product and the rubber latex are preferably in a dry solid weight ratio of from 1:1 to 1:15, more preferably from 1:3 to 1:12.

If the content of the rubber latex in the adhesive composition RFR is excessively small, the resultant modified fibrous material, sometimes exhibits an excessively large stiffness and a reduced resistance to fatigue. If the content of the rubber latex is excessively large, the resultant modified fibrous material exhibits an unsatisfactory bonding property to rubber and a decreased rubber coverage.

The adhesive composition can be impregnated into the fibrous material by any known methods, for example, roller coating, doctor coating, spraying and immersing.

Preferably, the fibrous material is impregnated with the RFL adhesive composition in an amount of from 0.1 to 10%, more preferably from 0.5 to 7%, by dry solid weight. The amount of the RFL adhesive composition to be impregnated in the fibrous material can be controlled in any known manner, for example, by squeezing the fibrous material immersed in the RFL adhesive composition by using a pair of nip rollers, or by removing an excessive amount of the RFL adhesive composition from the fibrous material by means of a scraper, air-flowing, suction or beating.

The RFL adhesive composition contained in the fibrous material is dried and cured at a temperature of 120° C. or more, preferably 180° C. or more, but not exceeding the melting point of the fibrous material, for example, from 180° C. to 250° C.

If the curing temperature is excessively low, the resultant modified fibrous material sometimes exhibits an unsatisfactory bonding property to rubber. Also, if the curing temperature is excessively high, sometimes the fibrous material is melted or exhibits a reduced mechanical strength, and therefore, the resultant modified fibrous material cannot be put to practical use.

The present invention will be further explained by way of examples, which are representative and do not restrict the scope of the present invention in any way.

In the examples, the following measurements were carried out.

(1) Ply bonding strength (peeling resistance)

This represents a bonding strength of the modified fibrous material to rubber and was determined in the following manner.

A natural rubber sheet having a thickness of 0.8 mm was interposed between two fibrous sheet specimens, and the resultant three layer composite laminate was further interposed between two rubber sheets having a thickness of 0.8 mm. The resultant laminate was vulcanized at a temperature of 150° C. for 30 minutes. The two fibrous sheet specimens were peeled from the laminate at a peeling speed of 200 mm/min. The bonding strength of each fibrous sheet specimen to the rubber sheet was represented by a force (kg/2 cm) necessary to complete the peeling of each fibrous sheet specimen. The resultant measurement data refers to an initial ply bonding strength of the fibrous sheet specimen.

The same laminate as that mentioned above was vulcanized at a temperature of 150° C. for 30 minutes and then further vulcanized at a temperature of 180° C. for 60 minutes.

The resultant measurement data refers to a ply bonding strength of the fibrous sheet specimen after further vulcanization.

(2) Tensile strength-retention after fatigue

A fibrous sheet specimen was subjected to a repeated fatigue test in which a 6% elongation and a 18% compression were applied between a pair of rotation discs to the specimen 350,000 times. The tensile strength (S) of the resultant specimen was determined by a Goodrich Disc Tester. Also, the tensile strength ($S_0$) of the original specimen was determined.

The tensile strength retention of the specimen after fatigue was calculated in accordance with the following equation:

$$\text{Tensile strength retention after fatigue (\%)} = \frac{S}{S_0} \times 100$$

REFERENTIAL EXAMPLE

A glass plate having a thickness of 0.2 mm was fixed on a base to which a substrate plate is to be attached in an ion-plating treatment apparatus. The apparatus is provided with a tantalum boat with an electric resistance heating device located in a lower portion of the apparatus. The tantalum boat was charged with 1.5 g of nylon 6 chips having an intrinsic viscosity of 1.34 and having been dried under vacuum.

The pressure of the inside space of the apparatus was reduced to a level of $5 \times 10^{-5}$ Torr and then oxygen gas was introduced to increase the pressure to a level of $5 \times 10^{-4}$ Torr. In this apparatus, a high frequency glow discharge was generated at a frequency of 13.56 MHz to apply a cold oxygen gas plasma treatment to the surface of the glass plate. This treatment was carried out at an electric discharge power of 100 W and a treatment time of one minute.

Then, the pressure of the inside space of the apparatus was reduced to a level of $5 \times 10^{-5}$ Torr, argon gas was introduced into the apparatus to increase the pressure to a level of $7 \times 10^{-4}$ Torr, and a cold argon gas plasma was generated at a discharge power of 100 W in the same manner as that mentioned above, while applying heating to melt and vaporize the nylon 6 chips. With the generation of the nylon 6 vapor, the pressure of the inside space of the apparatus increased. When the pressure reached a level of $5 \times 10^{-4}$ Torr, the introduction of the argon gas was stopped. The pressure of the inside space of the apparatus was maintained at a level of $5 \times 10^{-5}$ Torr by controlling the temperature and the vaporization rate of the nylon 6 melt.

In the above-mentioned procedure, the nylon 6 melt was vaporized in a cold argon gas plasma atmosphere under a reduced pressure and the resultant nylon 6 vapor was brought to a cold plasma state. The surface of the glass plate was ion-plated with the nylon 6 for 5 minutes at a discharge power of 100 W.

The heating operation for the nylon 6 chip was stopped and the pressure of the inside space of the apparatus was decreased to a level of $5 \times 10^{-5}$ Torr. Therefore, the pressure of the inside space of the apparatus was increased to the ambient atmospheric pressure.

It was found that the glass plate was coated with a nylon 6 membrane having an even thickness of 100 mm.

When the nylon 6 membrane was immersed in various organic solvents, for example, methyl alcohol, xylene, acetone or dimethylformamide, no deterioration of the nylon 6 membrane occurred.

Also, it was confirmed that the nylon 6 membrane was insoluble in a nylon 6 solvent, for example, formic acid, m-cresol, a 20% hydrochloric acid aqueous solution, a 60% sulfuric acid aqueous solution, a mixture of phenol with tetrachloroethane, and o-chlorophenol.

EXAMPLE 1

A fibrous material consisting of a plain weave fabric having a warp density of 29 yarns/25.4 mm and a weft density of 31 yarns/25.4 mm was produced from multifilament yarns having a yarn count of 1000 denier/677 filaments, having been produced by wet-spinning a wholly aromatic polyetheramide which is a polycondensation product of 25 molar % by p-phenylenediamine, 50 molar % of terephthalic acid chloride, and 25 molar % of 3,4'-diaminodiphenylether.

The same procedures as those described in the Referential Example were carried out except that the glass plate was replaced by the aromatic polyetheramide filament fabric.

The resultant nylon 6-plated fabric was impregnated with the RFL adhesive composition as shown in Table 1, was dried at a temperature of 120° C. for 2 minutes, and then cured at a temperature of 230° C. for 2 minutes.

The resultant modified fabric contained 7% by dry solid weight of the cured RFL adhesive composition.

The modified fabric was subjected to the ply bonding strength test.

The result is shown in Table 2.

TABLE 1

| Component | Amount (g) |
|---|---|
| Soft water | 596.8 |
| Sodium hydroxide | 1.0 |
| Resorcinol | 15.6 |
| Formaldehyde aqueous solution (37%) | 23.0 |
| Vinyl pyridine-styrene-butadiene Terpolymer latex*[1] | 363.6 |
| Total | 1,000.0 |

Note:
*[1]Trademark: Nipol 2518FS Maufacturer: Nippon Zeon Co. Dry solid content: 40% by weight

EXAMPLES 2 to 4

In each Examples 2 to 4, the same procedures as those described in Example 1 were carried out except that the oxygen gas for cold plasma generation was replaced by the type of gas as indicated in Table 2.

The results are shown in Table 2.

COMPARATIVE EXAMPLES 1 to 3

The same procedures as those mentioned in Examples 1, 2 and 3 were respectively carried out in Comparative Examples 1, 2, and 3 except that the ion-plating treatment was omitted.

The results of the ply bonding strength measurements are shown in Table 2.

TABLE 2

| Example No. | Cold plasma-generating gas | Ion-plating treatment | Ply bonding strength (kg/2 cm) | |
|---|---|---|---|---|
| | | | Initial vulcanization*[2] | After further vulcanization*[3] |
| Example | | | | |
| 1 | Oxygen | Applied | 21.6 | 14.1 |
| 2 | Ammonia | Applied | 23.5 | 13.4 |
| 3 | Tetrafluoromethane | Applied | 24.0 | 14.3 |
| 4 | Argon | Applied | 20.1 | 11.9 |
| Comparative Example | | | | |
| 1 | Oxygen | None | 20.0 | 4.7 |
| 2 | Ammonia | None | 19.7 | 5.3 |
| 3 | Tetrafluoromethane | None | 20.5 | 4.9 |

TABLE 2-continued

| Example No. | Cold plasma-generating gas | Ion-plating treatment | Ply bonding strength (kg/2 cm) | |
|---|---|---|---|---|
| | | | Initial vulcanization*2 | After further vulcanization*3 |
| 4 | — | None | 20.8 | 10.2 |

Note:
*2Vulcanization: 150° C., 30 minutes
*3Vulcanization: 150° C., 30 minutes Further vulcanization: 180° C., 60 minutes

COMPARATIVE EXAMPLE 4

The same aromatic polyetheramide filament fabric as that described in Example 1 was first impregnated with an epoxy resin composition as shown in Table 3. The first impregnated fabric was dried at a temperature of 120° C. for 2 minutes and then cured at a temperature of 230° C. for 2 minutes.

The resultant first treated fabric was further impreganted with a resorcinol-formaldehyde-rubber latex composition as shown in Table 4, and the further impregnated fabric was dried at a temperature of 120° C. or 2 minutes and then cured at a temperature of 230° C. for 2 minutes.

In the resultant modified fabric, the dry solid contents of the epoxy resin composition and the resorcinol-formaldehyde latex composition were 3.2% and 3.3%, respectively.

The ply bonding strength of the resultant modified fabric is indicated in Table 2.

TABLE 3

| Component | Amount (g) |
|---|---|
| Epoxy resin*4 | 2.22 |
| 10% Sodium hydroxide aqueous solution | 0.28 |
| Soft water | 96.94 |
| Total | 99.44 |

Note:
*4Phenol-formaldehyde condensate-epoxy compound, trademark: ECN-1299, made by Ciba-Geigy

TABLE 4

| Component | Amount (g) |
|---|---|
| Water | 462.09 |
| 10% Sodium hydroxide aqueous solution | 11.22 |
| 28% Ammonia water | 30.90 |
| 40% Resorcinol-formaldehyde precondensate solution in acetone*5 | 62.33 |
| 40% Styrene-butadiene copolymer aqueous latex*6 | 219.17 |
| 40% Vinylpyridine-styrene-butadiene terpolymer aqueous latex*7 | 175.39 |
| 37% formaldehyde aqueous solution | 38.90 |
| Total | 1,000.0 |

Note:
*5Made by Hodogaya Chemical Co., Trademark: ADHER RF
*6Made by Nippon Zeon Co., Trademark: Nipol LX110
*7Made by Nippon Zeon Co., Trademark: Nipol 2518 FS

EXAMPLE 5

The same procedures as those described in Example 1 were carried out except that the aromatic polyetheramide filament fabric was replaced by a polyester filament plain weave fabric consisting of polyethylene terephthalate multifilament yarns having a yarn count of 1500 deniers/192 filaments and having a warp density of 25 yarns/25.4 mm and a weft density of 25 yarns/25.4 mm, and the dry solid amount of the adhesive composition fixed on the modified fabric was 6%.

The result of the ply bonding strength measurement is shown in Table 5.

EXAMPLES 6 to 8

In each of Examples 6 to 8, the same procedures as those described in Example 5 were carrier out except that the cold plasma-generating oxygen gas was refreshed by the type of gas indicated in Table 5.

The results are shown in table 5.

COMPARATIVE EXAMPLES 5 to 7

The same procedures as those described in Examples 5, 6 and 7 were respectively carried out in Comparative Examples 5, 6 and 7, except that the ion-plating treatment was omitted.

The results are shown in Table 5.

TABLE 5

| Example No. | Cold plasma-generating gas | Ion-plating treatment | Ply bonding strength (kg/2 cm) | | Tensile strength-retention after fatigue (%) |
|---|---|---|---|---|---|
| | | | Initial vulcanization | After further vulcanization | |
| Example | | | | | |
| 5 | Oxygen | Applied | 24.3 | 14.7 | 95 |
| 6 | Air | Applied | 23.7 | 13.8 | 96 |
| 7 | Nitrogen | Applied | 21.6 | 14.3 | 96 |
| 8 | Argon | Applied | 20.7 | 13.0 | 95 |
| Comparative Example | | | | | |
| 5 | Oxygen | None | 16.3 | 5.3 | 89 |
| 6 | Air | None | 17.7 | 3.7 | 90 |
| 7 | Nitrogen | None | 12.4 | 6.0 | 88 |
| 8 | — | None | 20.8 | 11.2 | 93 |

COMPARATIVE EXAMPLE 8

The same polyester filament fabric as that described in Example 5 was first impregnated with a comparative resin composition as shown in Table 6.

TABLE 6

| Component | Amount (g) |
|---|---|
| Sorbitol polyglycidylether*8 | 6 |
| Sodium dioctylsulfosuccinate*9 | 8 |
| Soft water | 847 |
| Phenol block compound of 4,4'-diphenylmethane diisocyanate*10 | 14 |
| Vinylpyridine-styrene-butadine terpolymer aqueous latex*11 | 125 |

TABLE 6-continued

| Component | Amount (g) |
|-----------|------------|
| Total | 1000 |

Note:
*⁸Trademark: Denacol EX-611, made by Nagase Sangyo Co.
*⁹Trademark: Neocol SW-30, made by Daiichi Kogyo Seiyaku Co.
*¹⁰Trademark: Hylen MP, made by Du Pont The first impregnated fabric was dried at a temperature of 120° C. for 2 minutes and then cured at a temperature of 230° C. for 2 minutes. The resultant fabric was further impregnated with the adhesive composition as shown in table 1, dried at 120° C. for 2 minutes, and then cured at 230° C. for 2 minutes.

In the resultant modified fabric, the dry solid contents of the comparative resin composition shown in Table 6 and the adhesive composition shown in table 1 were 2.2% and 2.5%, respectively.

The resultant modified fabric exhibited the properties shown in Table 5.

We claim:

1. A process for producing a modified fibrous material useful for reinforcing rubber articles, comprising the steps of:
    applying a cold plasma treatment to a fibrous material comprising at least one type of synthetic fibers selected from aromatic polyamide fibers and polyester fibers, under a reduced pressure;
    applying an ion-plating treatment with a polyamide vapor to the resultant cold plasma-treated fibrous material under a reduced pressure to an extent such that the resultant ion-plated polyamide layer has a thickness of from 0.05 to 1 μm; and impregnating the resultant ion-plated fibrous material with an adhesive composition comprising a resorcinol-formaldehyde precondensation product and a rubber latex.

2. The process as claimed in claim 1, wherein the aromatic polyamide fibers in the fibrous material are selected from poly-p-phenylene terephthalamide fibers and poly-p-benzamide fibers.

3. The process as claimed in claim 1, wherein the aromatic polyamide fibers in the fibrous material comprises an aromatic polyetheramide having repeating units of the formulae (I), (II), (IV), and optionally, (III):

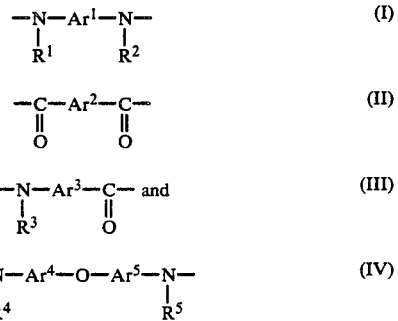

wherein Ar¹, Ar² and Ar³ respectively represent, independently from each other, amember selected from the group consisting of substituted and unsubstituted divalent aromatic hydrocarbon ring residues having two bonds extending in coaxial or parallel relationship to each other and substituted and unsubstituted divalent aromatic heterocyclic ring residues having two bonds located on two atoms spaced a largest distance in the ring, Ar⁴ and Ar⁵ respectively represent, independently from each other, a member selected from the group consisting of p-phenylene radical and x'-phenylene radical, and R¹, R², R³, R⁴ and R⁵ respectively represent, independently from each other, an alkyl radical having 1 to 5 carbon atoms.

4. The process as claimed in claim 3, wherein the sum of the molar amounts of the repeating units of the formula (I) and (IV) is substantially equal to that of formula (II), the repeating units of the formula (III) are in an amount of 0 to 90 molar %, and the repeating units of the formula (IV) are in an amount of 5 to 50 molar %, in the aromatic polyetheramide.

5. The process as claimed in claim 1, wherein the polyester fibers in the fibrous material are selected from polyethylene terephthalate fibers, polybutylene terephthalate fibers and polyethylene naphthalate fibers.

6. The process as claimed in claim 1, wherein the cold plasma treatment is carried out in an atmosphere containing at least one member selected from the group consisting of oxygen, nitrogen, ammonia, nitrogen monoxide, argon, helium, and tetrafluoromethane gases.

7. The process as claimed in claim 1, wherein the cold plasma treatment is carried out at a temperature of from 20° C. to 200° C.

8. The process as claimed in claim 1, wherein the cold plasma treatment is carried out under a pressure of from $10^{-5}$ to 10 Torr.

9. The process as claimed in claim 1, wherein the polyamide vapor to be used in the ion-plating treatment consists of at least one member selected from poly-ε-capramide, polyhexamethylene adipamide, and polyhexamethylene sebacamide.

10. The process as claimed in claim 1, wherein the ion-plating treatment is carried out under a reduced pressure of $10^{-5}$ to 10 Torr.

11. The process as claimed in claim 1, wherein the ion-plated polyamide deposited on the fibrous material is in a thickness of 0.05 to 1 μm.

12. The process as claimed in claim 1, wherein in the adhesive composition, the rubber is selected from natural rubber, styrene-butadiene copolymer rubber, vinyl pyridine-styrene-butadiene terpolymer rubber, nitrile rubber, and chloroprene rubber.

13. The process as claimed in claim 1, wherein the resorcinol-formaldehyde precondensation product and the rubber latex are in a dry solid weight ratio of from 1:1 to 1:15.

14. The process as claimed in claim 1, wherein the adhesive composition is impregnated in an amount of 0.1 to 10% by dry solid weight in the fibrous material.

15. The process as claimed in claim 1, wherein the adhesive composition impregnated in the fibrous material is dried and cured at a temperature of 120° C. or more.

* * * * *